(12) United States Patent
Bhat et al.

(10) Patent No.: US 10,345,784 B2
(45) Date of Patent: Jul. 9, 2019

(54) LADDER LOGIC GRAPHICAL PROGRAMMING AND TEXTUAL PROGRAMMING SYNCHRONIZATION

(71) Applicant: Rockwell Automation Technologies, Inc., Mayfield Heights, OH (US)

(72) Inventors: Adarsh Bhat, Singapore (SG); Jean-Sebastien Kovacs, Brossard (CA); Haojie Zheng, Singapore (SG); Pujianto Cemerlang, Singapore (SG); Thomas Sugimoto, Singapore (SG)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 148 days.

(21) Appl. No.: 15/697,299

(22) Filed: Sep. 6, 2017

(65) Prior Publication Data

US 2019/0072929 A1    Mar. 7, 2019

(51) Int. Cl.
*G06F 9/44*    (2018.01)
*G05B 19/05*    (2006.01)

(52) U.S. Cl.
CPC .. *G05B 19/056* (2013.01); *G05B 2219/23291* (2013.01)

(58) Field of Classification Search
CPC . G06F 8/31; G06F 8/30; G06F 9/4428; G06F 8/423; G06F 9/4425
USPC .......................................................... 717/114
See application file for complete search history.

(56) References Cited

U.S. PATENT DOCUMENTS 6,108,662 A * 8/2000 Hoskins ................. G06Q 10/06
    700/95

* cited by examiner

*Primary Examiner* — Chuck O Kendall
(74) *Attorney, Agent, or Firm* — Kunzler Bean & Adamson

(57) ABSTRACT

For ladder logic graphical programming and textual programming synchronization, a processor dynamically synchronizes a graphical ladder logic programming interface to an executable code base of ladder logic instructions. The processor further concurrently dynamically synchronizes a textual ladder logic programming interface to the executable code base.

20 Claims, 13 Drawing Sheets

200

| Graphical Representation Edit Indicator 240 |
|---|
| Textual Representation Edit Indicator 245 |
| Graphical Entry Pause Indicator 215 |
| Textual Entry Pause Indicator 220 |
| Graphical Refresh Complete Indicator 280 |
| Textual Refresh Complete Indicator 285 |

240

| Rung 0 Edit Indicator 230a |
| Rung 1 Edit Indicator 230b |

| Rung n Edit Indicator 230n |

245

| Rung 0 Edit Indicator 235a |
| Rung 1 Change Indicator 235b |

| Rung n Edit Indicator 235n |

LADDER LOGIC GRAPHICAL PROGRAMMING AND TEXTUAL PROGRAMMING SYNCHRONIZATION

BACKGROUND INFORMATION

The subject matter disclosed herein relates to synchronizing ladder logic graphical programming and textual programming interfaces.

BRIEF DESCRIPTION

A method for ladder logic graphical programming and textual programming synchronization is disclosed. A processor dynamically synchronizes a graphical ladder logic programming interface to an executable code base of ladder logic instructions. The processor further concurrently dynamically synchronizes a textual ladder logic programming interface to the executable code base.

An apparatus for ladder logic graphical programming and textual programming synchronization is also disclosed. The apparatus includes a processor and a memory storing code executable by the processor. The processor dynamically synchronizes a graphical ladder logic programming interface to an executable code base of ladder logic instructions. The processor further concurrently dynamically synchronizes a textual ladder logic programming interface to the executable code base.

A computer program product for ladder logic graphical programming and textual programming synchronization is also disclosed. A processor dynamically synchronizes a graphical ladder logic programming interface to an executable code base of ladder logic instructions. The processor further concurrently dynamically synchronizes a textual ladder logic programming interface to the executable code base.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
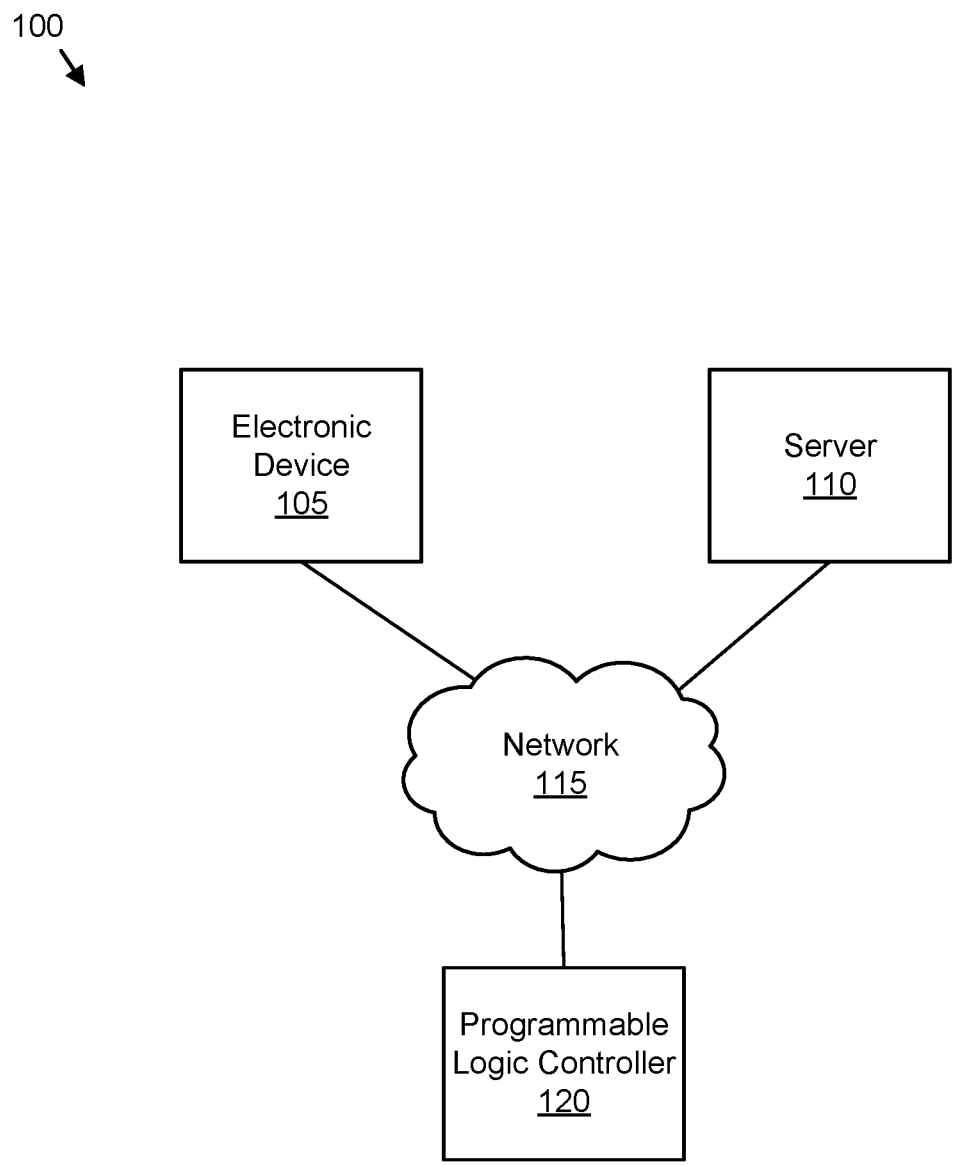
FIG. 1A is a schematic block diagram of a ladder logic programming system according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object-oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general-purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of a ladder logic programming system 100a. The system 100a may program a programmable logic controller 120. In the depicted embodiment, the system 100a includes an electronic device 105, a server 110, a network 115, and the programmable logic controller 120.

The programmable logic controller 120 may control equipment and/or devices in an industrial environment. The programmable logic controller 120 may execute an executable code base to control the equipment and/or the devices.

The network 115 may be the Internet, a wide-area network, a mobile telephone network, a local area network, a Wi-Fi network, or combinations thereof. The programmable logic controller 120 may communicate with the network 115. The server 110 may also be in communication with the network 115. The server 110 may store the executable code base. The programmable logic controller 120 may download the executable code base.

The electronic device 105 may be a computer workstation, a laptop computer, tablet computer, a mobile telephone, or the like. The electronic device 105 may also be in communication with the network 115. The electronic device 105 may create and/or edit the executable code base as will be described hereafter. For example, the electronic device 105 may create the executable code base for the programmable logic controller 120 and store the executable code base to the server 110. The electronic device 105 may further direct the server 110 to download the executable code base to the programmable logic controller 120.

In one embodiment, the electronic device 105 stores the executable code base through the network 115 to the programmable logic controller 120. In addition, the electronic device 105 may edit the executable code base of the programmable logic controller 120.

Figure 1B:
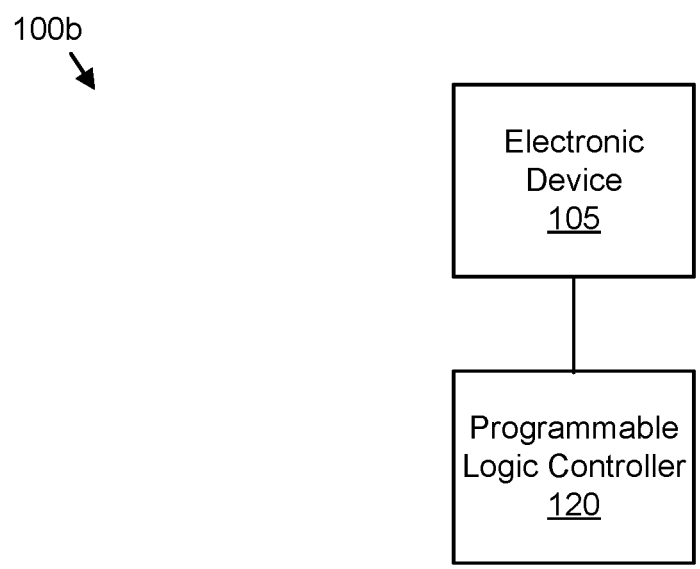
FIG. 1B is a schematic block diagram of a ladder logic programming system according to an alternate embodiment.

FIG. 1B is a schematic block diagram of a ladder logic programming system 100b. In the depicted embodiment, the system 100b includes the electronic device 105 and the programmable logic controller 120. The electronic device 105 may communicate with the programmable logic controller 120 via a serial link, a bus, and/or a wireless interface. The electronic device 105 may create the executable code base and store the executable code base to the programmable logic controller 120. In one embodiment, the electronic device 105 edits the executable code base stored on the programmable logic controller 120.

Figure 1C:
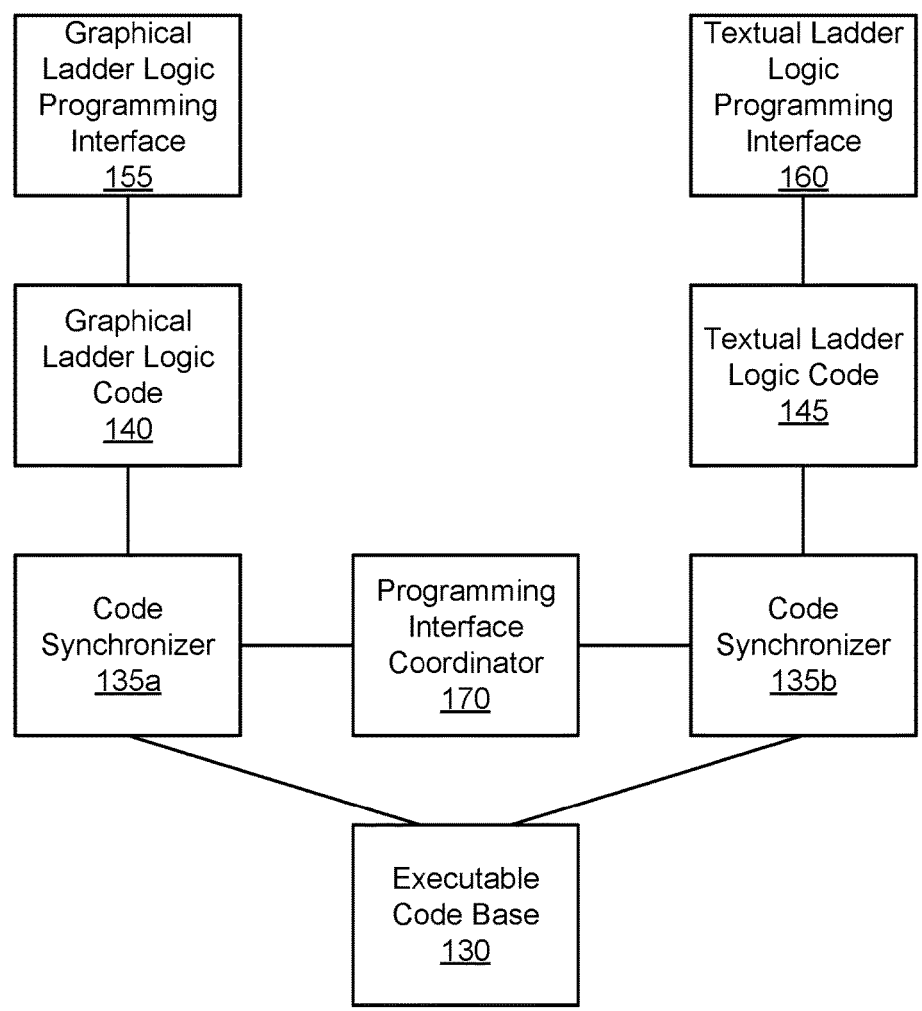
FIG. 1C is a schematic block diagram of ladder logic programming flow according to an embodiment.

FIG. 1C is a schematic block diagram of ladder logic programming flow 101. The executable code base 130 is shown. The executable code base 130 may be organized as a data structure in a memory. The executable code base 130 may reside on one or more of the electronic device 105, the server 110, and the programmable logic controller 120. The executable code base 130 may include ladder logic instructions that are executed by the programmable logic controller 120.

The executable code base 130 may be created and/or edited by a graphical ladder logic programming interface 155 and/or a textual ladder logic programming interface 160. The graphical ladder logic programming interface 155 and the textual ladder logic programming interface 160 may be executed on the electronic device 105. The graphical ladder logic programming interface 155 and the textual ladder logic programming interface 160 may be organized as code that is stored in a memory and executed by a processor.

The graphical ladder logic programming interface 155 may create and/or edit graphical ladder logic code 140. The graphical ladder logic code 140 may be organized as a data structure in a memory. The graphical ladder logic code 140 may include data and data structures that represent the executable code base 130 through the graphical ladder logic programming interface 155 as a graphical display.

The textual ladder logic program interface 160 may create and/or edit textual ladder logic code 145. The textual ladder logic code 145 may be organized as a data structure in a memory. The textual ladder logic code 145 may include data and data structures that represent the executable code base 130 through the textual ladder logic programming interface 160 as a textual display.

In the past, users have created and edited the executable code base 130 using one of the graphical ladder logic programming interface 155 and the textual ladder logic programming interface 160. Each of the programming interfaces 155/160 has unique advantages and disadvantages in the creation of the executable code base 130 for the programmable logic controller 120. For example, the graphical ladder logic program interface 155 allows for easy visualization of components while the textual ladder logic programming interface 160 allows for rapid changes to components and component parameters.

The embodiments described herein allow the graphical ladder logic programming interface 155 and the textual ladder logic program interface 160 to be used concurrently to create and/or edit the executable code base 130 by dynamically synchronizing the graphical ladder logic program interface 155 to the executable code base 130 and concurrently dynamically synchronizing the textual ladder logic programming interface 160 to the executable code base 130. As a result, a user may create and/or edit the executable code base 130 by concurrently using the graphical ladder logic programming interface 155 and the textual ladder logic programming interface 160. Thus, the user may take advantage of the best features of each programming interface 155/160 to more effectively create and/or edit the executable code base 130.

Code synchronizers 135a-b may detect edits to the graphical ladder logic code 140 and/or the textual ladder logic code 145. In addition, the code synchronizers 135a-b may communicate notifications of the changes to the programming interface coordinator 170. The programming interface coordinator 170 may coordinate and synchronize changes between the graphical ladder logic code 140 and the textual ladder logic code 145. The code synchronizers 135a-b and the programming interface coordinator 170 may be organized as one or more software routines executing on a processor.

A first code synchronizer 135 may notify the programming interface coordinator 170 of an edit to one of the graphical ladder logic code 140 and the textual ladder logic code 145. In one embodiment, the program interface coordinator 170 notifies the other code synchronizers 135 of the edit. In addition, the programming interface coordinator 170 may dynamically synchronize the graphical ladder logic code 140 and the textual ladder logic code 145. The programming interface coordinator 170 may further assure consistency between the graphical ladder logic code 140 and the textual ladder logic code 145 as the graphical ladder logic code 140 and the textual ladder logic code 145 are translated to the executable code base 130.

Figure 2A:
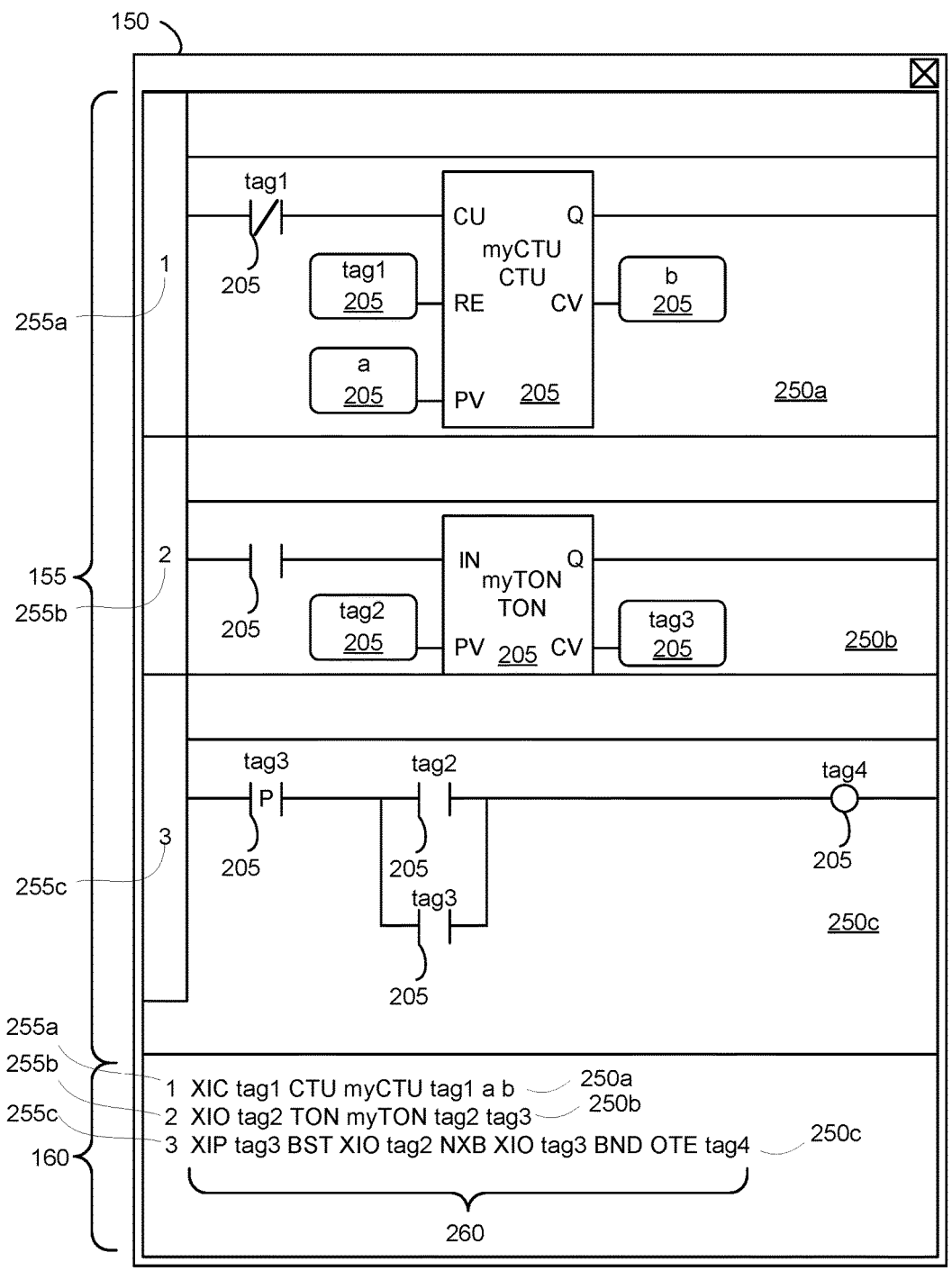
FIG. 2A is a drawing of a graphical ladder logic programming interface and a textual ladder logic programming interface according to an embodiment.

FIG. 2A is a drawing of a graphical ladder logic programming interface 155 and a textual ladder logic programming interface 160. In the depicted embodiment, the graphical ladder logic program interface 155 and the textual ladder logic programming interface 160 are displayed concurrently in a single window 150 of the electronic device 105. In an alternative embodiment, the graphical ladder logic programming interface 155 may be displayed in a first window 150 in the textual ladder logic program interface 160 may be displayed in a second window 150 of the electronic device 105.

The graphical ladder logic programming interface 155 includes a plurality of schematic programming elements 205. The schematic programming elements 205 may be identified by a tag. The schematic programming elements 205 may be indicative of ladder logic instructions performed by the programmable logic controller 120. The schematic programming elements 205 may be directly translatable into the graphical ladder logic code 140.

The executable code base 130 may be organized as a plurality of rungs 250a-c. The graphical ladder logic programming interface 155 may present each rung 250 as a sequentially ordered area. Each rung 250a-c may be identified by a rung identifier 255a-c.

The textual ladder logic programming interface 160 includes a plurality of textual programming elements 260. In the depicted embodiment, the textual programming elements 260 are organized in a plurality of rungs 250a-c. Each rung 250a-c may comprise a single line of textual programming elements 260. In addition, one or more rungs 250 may include multiple lines of textual programming elements 260. Each rung 250a-c may be identified by a run identifier 255a-c.

Figure 2B:
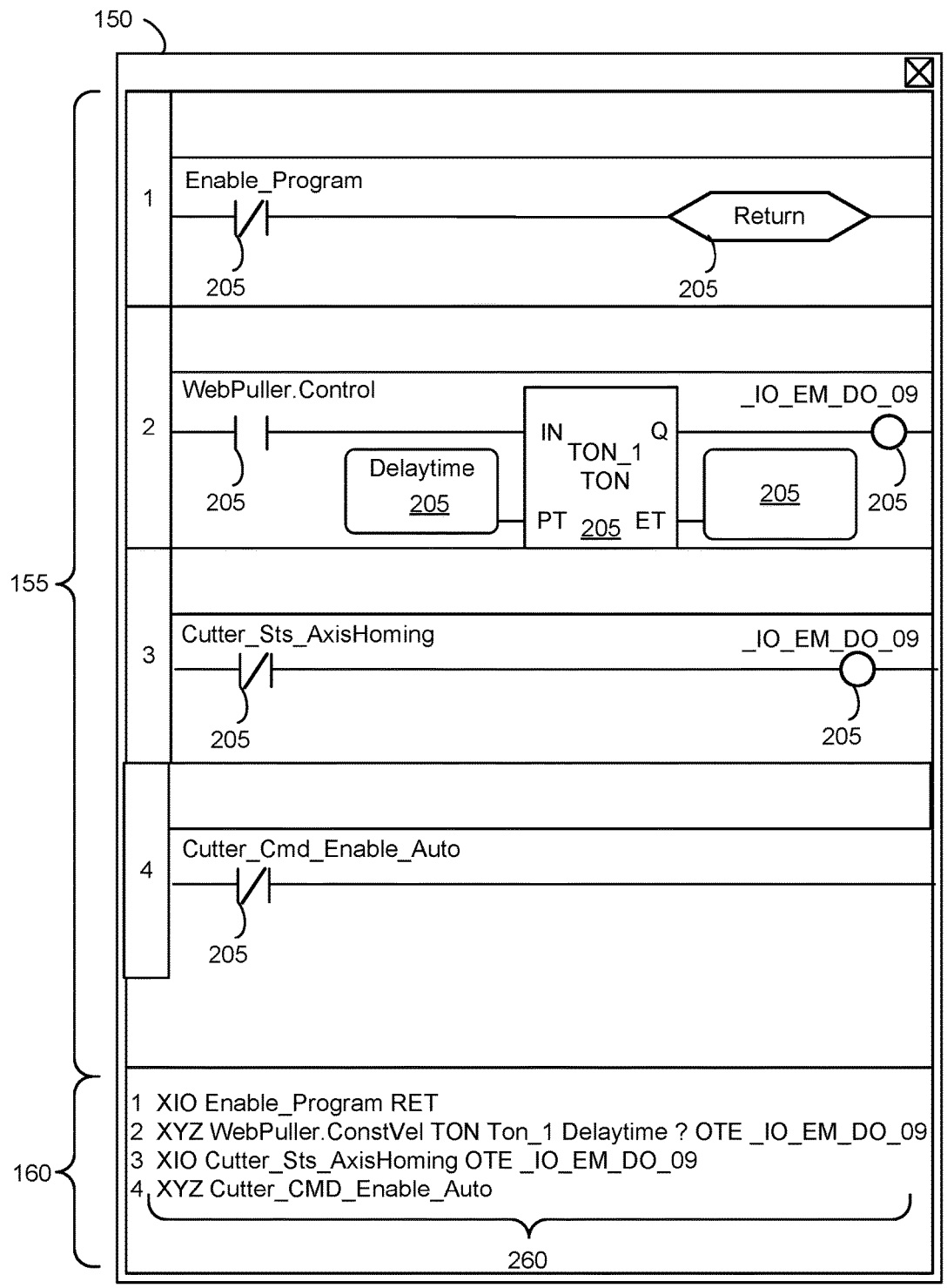
FIG. 2B is a drawing of a graphical ladder logic programming interface and a textual ladder logic programming interface according to an alternate embodiment.

FIG. 2B is a drawing of a graphical ladder logic programming interface 155 and a textual ladder logic programming interface 160. In the depicted embodiment, the executable code base 130 is represented by the graphical ladder logic programming interface 155 and the textual what ladder logic programming interface 160. For clarity, previously identified elements including the rungs 250, rung indicators 255, and textual programming elements 210 are not labeled.

Figure 2C:
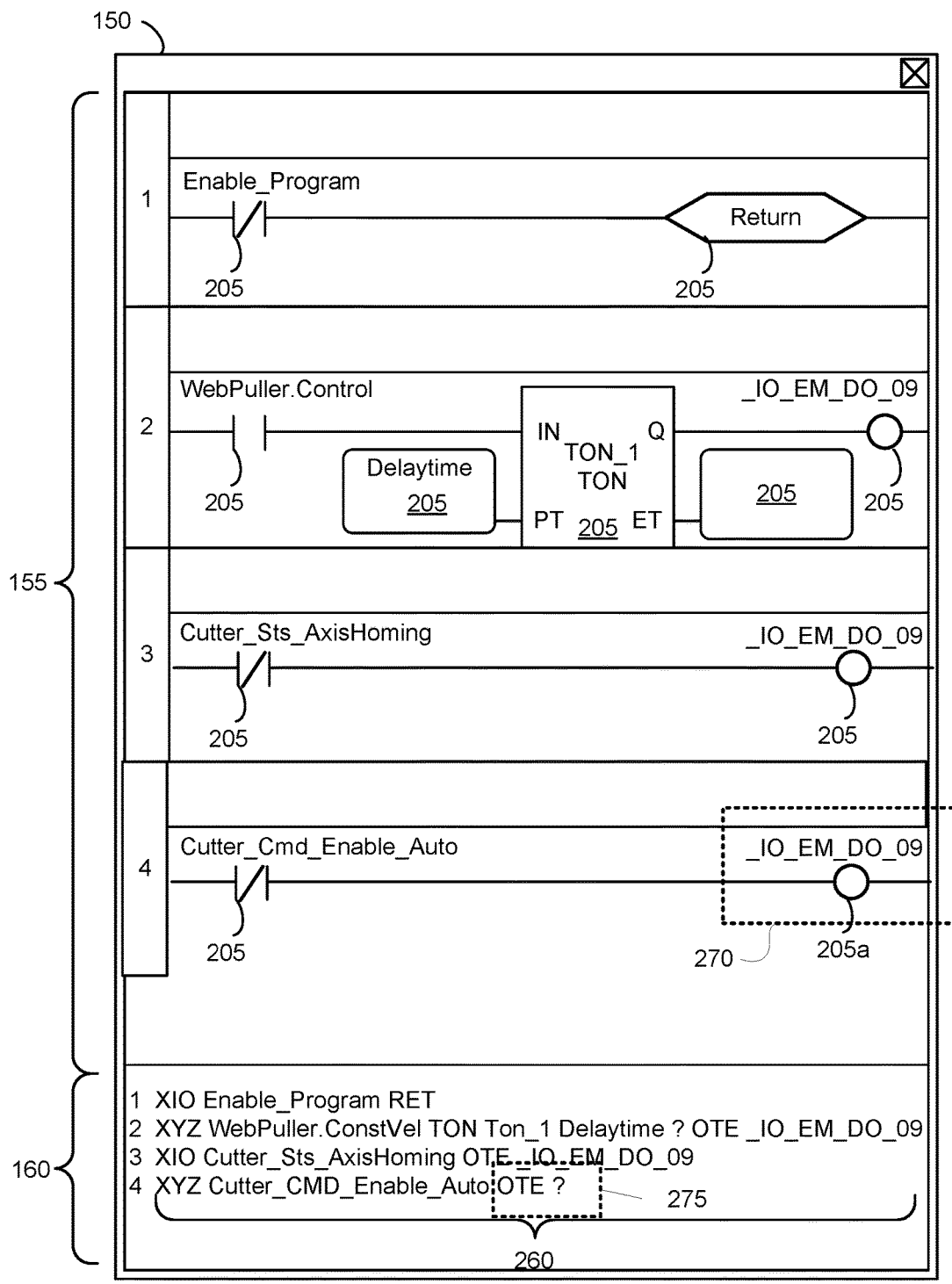
FIG. 2C is a drawing a graphical ladder logic programming interface and a textual ladder logic programming interface according to an alternate embodiment.

FIG. 2C is a drawing of a graphical ladder logic programming interface 155 and a textual ladder logic programming interface 160. In the depicted embodiment, an edit 270 comprising a first a schematic programming element 205a is added to the graphical ladder logic program interface 155 of FIG. 2B. The first code synchronizer 135a and/or the programming interface coordinator 170 may detect the edit 270 and synchronize the edit 270 to the textual ladder logic programming interface 260 as a synchronized edit 275. As a result, a user may subsequently make subsequent second edits to the textual ladder logic programming interface 260 without the graphical ladder logic code 140 and the textual ladder logic code 145 representing different versions of the executable code base 130.

Figure 3A:
FIG. 3A is a schematic block diagram of synchronization data according to an embodiment.

FIG. 3A is a schematic block diagram of synchronization data 200. The synchronization data 200 may be organized as a data structure in a memory. In the depicted embodiment, the synchronization data 200 includes a graphical representation edit indicator 240, a textual representation edit indicator 245, a graphical entry pause indicator 215, a textual entry pause indicator 220, a graphical refresh complete indicator 280, and a textual refresh complete indicator 285.

The graphical representation edit indicator 240 may be set to indicate that an edit 270 is made to the graphical ladder logic code 140. In one embodiment, the graphical representation edit indicator 240 is set when an edit 270 comprising one or more of an addition, a change, and deletion is made to the graphical ladder logic code 140 by the graphical ladder logic programming interface 155. In addition, the graphical representation edit indicator 240 may be cleared to indicate that the edit 270 is synchronized to the textual ladder logic code 145 and the textual ladder logic programming interface 160.

The textual representation edit indicator 245 may be set to indicate that an edit 270 is made to the textual ladder logic code 145. In one embodiment, the textual representation edit indicator 245 is set when an edit 270 is made to the textual ladder logic code 145 by the textual ladder logic programming interface 160. In addition, the texel representation change indicator 245 may be cleared to indicate that the edit 270 is synchronized to the graphical ladder logic code 140 and the graphical ladder logic programming interface 155.

The graphical entry pause indicator 215 is set to pause edits 270 to the graphical ladder logic code 140 and the graphical ladder logic programming interface 155. In response to setting the graphical entry pause indicator 215, no edits 270 are accepted by the graphical ladder logic programming interface 155. In addition, the graphical entry pause indicator 215 may be cleared to allow edits 270 to the graphical ladder logic code 140 and the graphical ladder logic programming interface 155.

The textual entry pause indicator 220 is set to pause edits 272 the textual ladder logic code 145 and the textual ladder logic programming interface 160. In response to setting the textual entry pause indicator 220, no edits 270 are accepted by the textual ladder logic programming interface 160. In addition, the textual entry pause indicator 220 may be cleared to allow subsequent edits 270 to the textual ladder logic code 145 and the textual ladder logic programming interface 160.

The graphical refresh complete indicator 280 may be set to indicate that the graphical ladder logic programming interface 155 and graphical ladder logic code 140 are refreshed with the edit 270 to the textual ladder logic programming interface 160 and the textual ladder logic code 145. The graphical refresh complete indicator 280 may be cleared after an interrogation by one or more programming elements.

The textual refresh complete indicator 285 may be set to indicate that the textual ladder logic programming interface 160 and textual ladder logic code are refreshed with the edit 270 to the graphical ladder logic programming interface 155 and the graphical ladder logic code 140. The textual refresh complete indicator 285 may be cleared after an interrogation by one or more programming elements.

The synchronization data 200 improves the efficiency of a processor in synchronizing the graphical ladder logic programming interface 155 and the textual ladder logic programming interface 160. The synchronization data 200 provides clear and unambiguous indications of when editing to the graphical ladder logic program interface 155 or the textual ladder logic program interface 160 is allowable and when editing must be paused. In addition, the synchronization data 200 provides clear and unambiguous indications of all elements of a synchronization process as will be described hereafter. As a result, a processor and/or computer may rapidly synchronize the graphical ladder logic programming interface 155 and the textual ladder logic programming interface 160.

Figure 3B:
FIG. 3B is a schematic block diagram of a graphical representation change indicator according to an embodiment.

FIG. 3B is a schematic block diagram of a graphical representation edit indicator 240. The graphical representation edit indicator 240 may be organized as a data structure in a memory. In the depicted embodiment, the graphical representation edit indicator 240 includes a plurality of rung edit indicators 230a-n. Each rung 250 of the graphical ladder logic programming interface 155 may be represented by a rung edit indicator 230a-n. In response to an edit 270 to a rung 250 in the graphical ladder logic programming interface 155, the corresponding rung edit indicator 230 may be set. In addition, the rung edit indicator 230 may be cleared when the edit 270 to the rung 250 is synchronized to the corresponding rung 250 of the textual ladder logic programming interface 160 and the textual ladder logic code 145.

Figure 3C:
FIG. 3C is a schematic block diagram of a textual representation change indicator according to an embodiment.

FIG. 3C is a schematic block diagram of a textual representation edit indicator 245. The textual representation edit indicator 245 may be organized as a data structure in a memory. In the depicted embodiment, the textual representation edit indicator 245 includes a plurality of rung edit indicators 235a-n. Each rung 250 of the textual ladder logic programming interface 160 may be represented by a rung edit indicator 235a-n. In response to an edit 270 to a rung 250 in the textual ladder logic programming interface 160, the corresponding rung edit indicator 235 may be set. In addition, the rung edit indicator 235 may be cleared when the edit 270 to the rung 250 is synchronized to the corresponding rung 250 of the graphical ladder logic programming interface 155 and the graphical ladder logic code 140.

Figure 4:
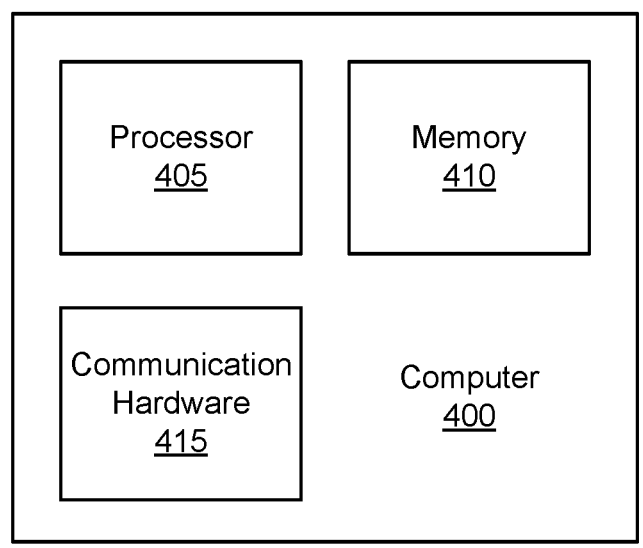
FIG. 4 is a schematic block diagram of a computer according to an embodiment.

FIG. 4 is a schematic block diagram of a computer 400. The computer 400 may be embodied in the electronic device 105. In addition, the computer 400 may be embodied in the electronic device 105, the server 110, and the programmable logic controller 120. In the depicted embodiment, the computer 400 includes a processor 405, a memory 410, and communication hardware 415. The memory 410 may include a semiconductor storage device, hard disk drive, an optical storage device, a micromechanical storage device, and combinations thereof. The memory 410 may store code such a program code. The processor 405 may execute the code. The communication hardware 415 may communicate with other devices such as the network 115 and/or the programmable logic controller 120.

Figure 5A:
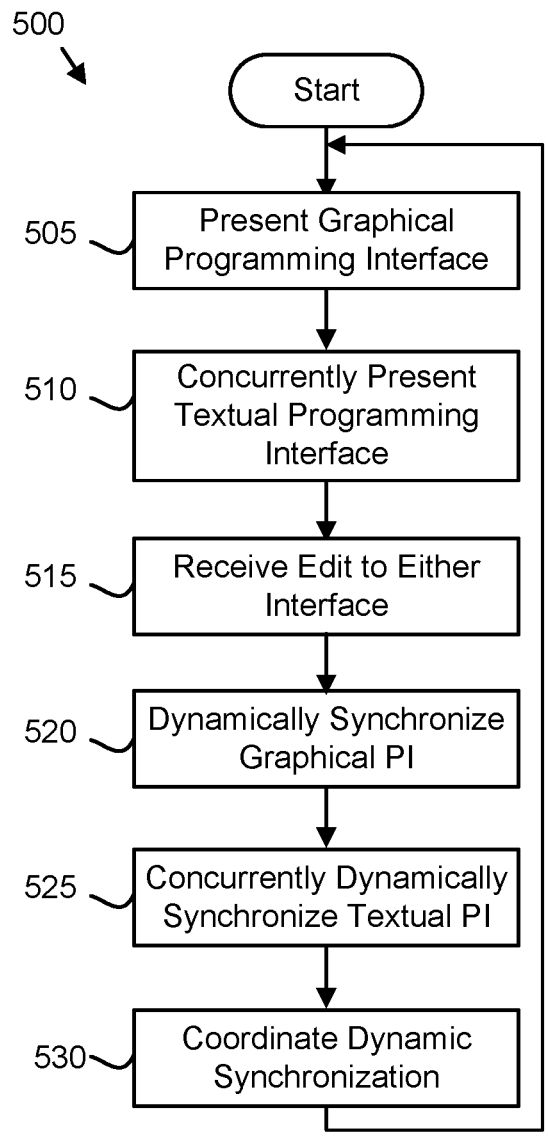
FIG. 5A is a schematic flow chart diagram of a synchronization method according to an embodiment.

FIG. 5A is a schematic flow chart diagram of a synchronization method 500. The method 500 may dynamically synchronize the graphical ladder logic programming interface 155 and concurrently dynamically synchronize the textual ladder logic programming interface 160. The method 500 may be performed by the processor 405.

The method 500 starts, and in one embodiment, the processor 405 presents 505 the graphical ladder logic programming interface 155. The graphical ladder logic programming interface 155 may be presented 505 via the electronic device 105. In one embodiment, the graphical ladder logic programming interface 155 is presented 505 in a window 150 of the electronic device 105. In addition, the graphical ladder logic programming interface 155 may represent the graphical ladder logic code 140.

The processor 405 may further concurrently present 510 the textual ladder logic programming interface 160. The textual ladder logic programming interface 160 may be presented 510 via the electronic device 105. In addition, the textual ladder logic programming interface 160 may be presented in a window 150 of the electronic device 105. The textual ladder logic programming interface 160 may represent the textual ladder logic code 145.

In one embodiment, the graphical ladder logic programming interface 155 and the textual ladder logic programming interface 160 are both presented 505/510 in the same window 150. Alternatively, the graphical ladder logic programming interface 155 is presented 505 in a first window 150 and the textual ladder logic programming interface 160 is presented 510 in a second window 150.

The processor 405 may receive 515 an edit 270 to either the graphical ladder logic programming interface 155 or the textual ladder logic programming interface 160. The edit 270 may be in addition, a deletion, a change, or the like. FIG. 2C shows one example of an edit 270 to the graphical ladder logic programming interface 155 of FIGS. 2B-C. The edit 270 may be made using standard editing tools.

In one embodiment, the processor 405 sets the graphical representation edit indicator 240 in response to receiving 515 the edit 270 to the graphical ladder logic programming interface 155. In addition, the processor 405 may set the textual representation edit indicator 245 in response to receiving 515 the edit 270 to the textual ladder logic programming interface 160.

The processor 405 may dynamically synchronize 520 the graphical ladder logic programming interface 155 to the executable code base 130 of ladder logic instructions. The synchronization 520 of the graphical ladder logic programming interface 155 to the executable code base 130 is described in more detail in FIGS. 5B-C. In one embodiment, the executable code base 130 comprises the edit 270 in response to synchronizing 520 the graphical ladder logic programming interface 155. In addition, the graphical ladder logic programming interface 155 accurately reflects the executable code base 130 in response to synchronizing 520 the graphical ladder logic programming interface 155.

The processor 405 may concurrently dynamically synchronize 525 the textual ladder logic programming interface 160 to the executable code base 130 of ladder logic instructions. The synchronization 525 of the textual ladder logic programming interface 160 to the executable code base 130 is described in more detail in FIGS. 5B and 5D. The executable code base 130 may comprise the edit 270 in response to synchronizing 525 the textual ladder logic programming interface 160. The textual ladder logic programming interface 160 may further accurately reflect the executable code base 130 in response to synchronizing 525 the textual ladder logic programming interface 160 to the executable code base 130.

In one embodiment, the processor 405 coordinates 530 the dynamic synchronization 520 of the graphical ladder logic programming interface 155 and the dynamic synchronization 525 of the textual ladder logic programming interface 160. The processor 405 may employ the synchronization data 200 to synchronize 520 the programming interfaces 155/160. The coordination 530 of the dynamic synchronization 520 of the graphical ladder logic programming interface 155 and the dynamic synchronization 525 of the textual ladder logic programming interface 160 are described in more detail in FIGS. 5B-D. After coordinating 530 the dynamic synchronization 520 of the graphical ladder logic programming interface 155 and the dynamic synchronization 525 of the textual ladder logic programming interface 160, the processor 405 may continue to present 505 the graphical ladder logic programming interface 155.

Figure 5B:
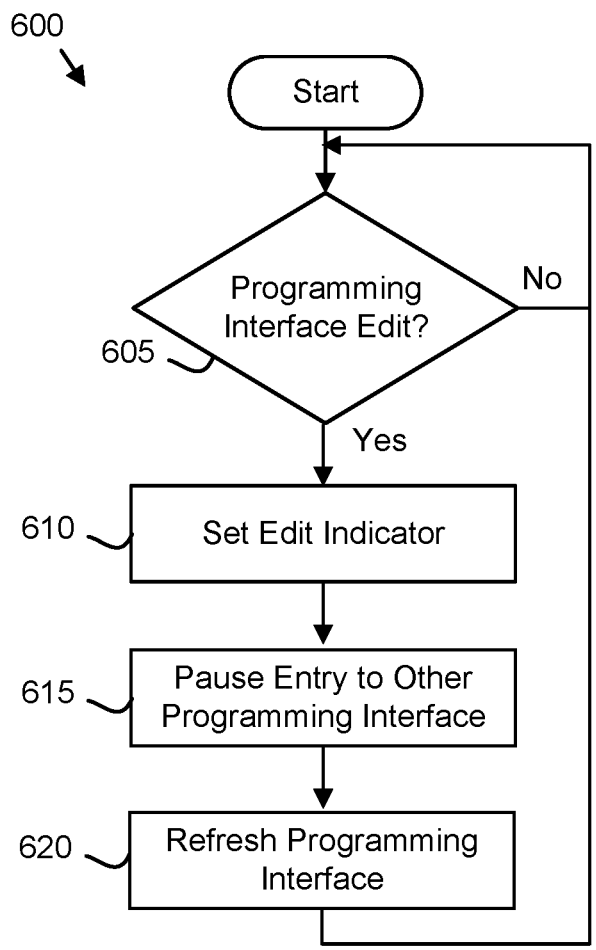
FIG. 5B is a schematic flow chart diagram of a coordination method according to an embodiment.

FIG. 5B is a schematic flow chart diagram of a coordination method 600. The coordination method 600 may coordinate 530 the dynamic synchronization 520 of the graphical ladder logic programming interface 155 and the dynamic synchronization 525 of the textual ladder logic programming interface 160 is described in FIG. 5A. The coordination method 600 may be performed by the processor 405.

The method 600 starts, and in one embodiment, the processor 405 detects 605 an edit 270 to one of the graphical ladder logic programming interface 155 and the textual ladder logic programming interface 160. If the processor 405 does not detect 605 the edit 270, the processor 405 loops to continue detecting 605 the edit 270.

If the processor 405 detects 605 the edit 270 to one of the graphical ladder logic programming interface 155 and the textual ladder logic programming interface 160, the processor 405 sets the corresponding edit indicator 240/245. For example, if a first edit 270 to the graphical ladder logic programming interface 155 is detected 605, the processor 405 sets 610 the graphical representation edit indicator 240. In addition, if a first edit 270 to the textual ladder logic programming interface 160 is detected 605, the processor 405 may set 610 the textual representation edit indicator 245.

The processor 405 may pause 615 entry of a second subsequent edit 270 to the other of the graphical ladder logic programming interface 155 and the textual ladder logic programming interface 160. The processor 405 may pause 615 the entry of the second subsequent edit 270 by setting one of the graphical entry pause indicator 215 and the textual entry pause indicator 220. For example, if the first edit 270 is detected 605 at the graphical ladder logic programming interface 155, the processor 405 may pause 615 entry of the second subsequent edit 270 to the textual ladder logic programming interface 160. Alternatively, if the first edit 270 is detected 605 at the textual ladder logic programming interface 160, the processor 405 may pause 615 entry of the second subsequent edit 270 to the graphical ladder logic programming interface 155.

The processor 405 may refresh 620 the first edit 270 to the other of the graphical ladder logic programming interface 155 and the textual ladder logic programming interface 160. In one embodiment, the processor 405 refreshes 620 the other of the graphical ladder logic programming interface 155 and the textual ladder logic programming interface 160 by propagating the edit 270 from the programming interface 155/160 that received the edit 270 to the other programming interface 155/160 that did not receive the edit 270. In a certain embodiment, the synchronized edit 275 is made to the other programming interface 155/160 that did not receive the edit 270.

For example, if the edit 270 is detected at the textual ladder logic programming interface 160, the processor 405 may refresh 620 the graphical ladder logic programming interface 155 by propagating the edit 270 to the textual ladder logic code 145. The processor 405 may further synchronize the textual ladder logic code 145 to the executable code base 130 using the code synchronizer 135b. The processor 405 may further employ the programming interface coordinator 170 and the code synchronizer 135a to synchronize the executable code base 130 with the graphical ladder logic code 140. In addition, the processor 405 may propagate the graphical ladder logic code 140 to the graphical ladder logic programming interface 155.

In an alternative example, if the edit 270 is detected at the graphical ladder logic programming interface 155, the processor 405 may refresh 620 the textual ladder logic programming interface 160 by propagating the edit 270 to the graphical ladder logic code 140. In addition, the processor may synchronize the graphical ladder logic code 140 to the executable code base 130 using the code synchronizer 135a. The processor may further employ the programming interface coordinator 170 and the code synchronizer 135b to synchronize the executable code base 130 with the textual ladder logic code 145. The processor 405 may further propagate the textual ladder logic code 145 to the textual ladder logic programming interface 160.

In response to refreshing the other programming interface 155/160, the processor may continue to detect 605 the programming interface edit 270.

Figure 5C:
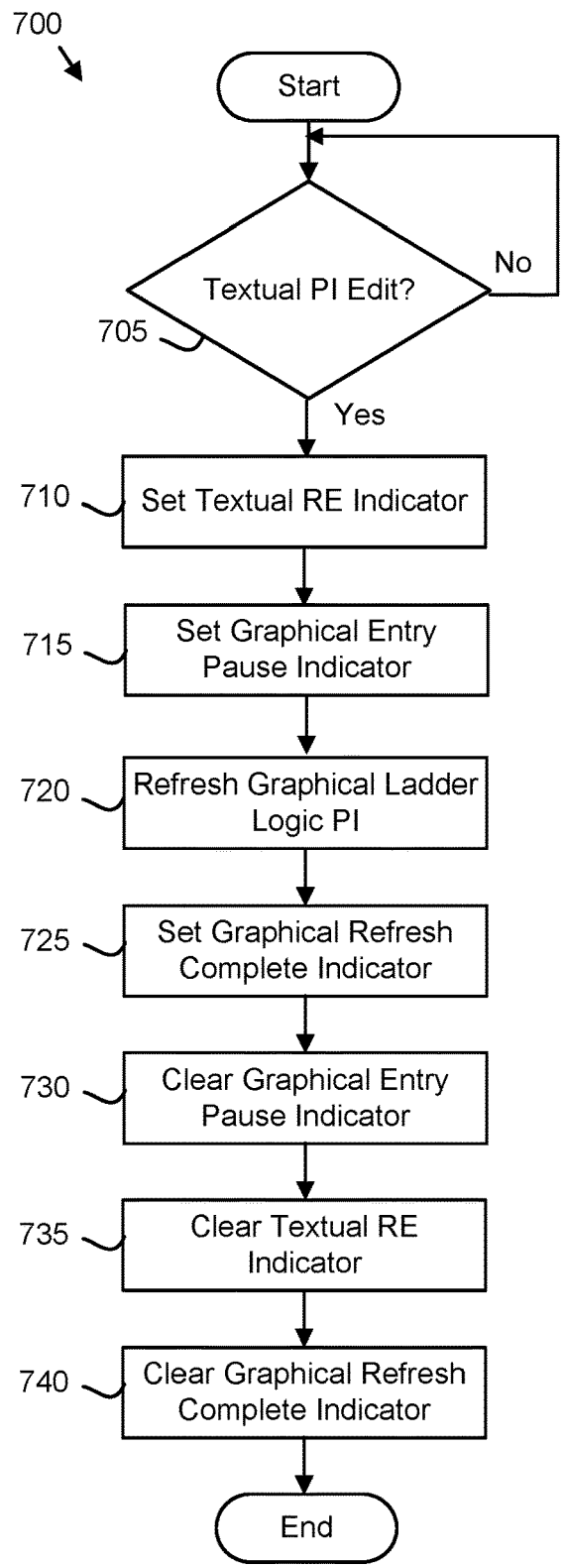
FIG. 5C is a schematic flowchart diagram of a coordination method according to an alternative embodiment.

FIG. 5C is a schematic flowchart diagram of a coordination method 700. The coordination method 270 may coordinate dynamic synchronization of a first edit 270 at the textual ladder logic programming interface 160 to the graphical ladder logic programming interface 155. The method 700 may perform one embodiment of step 530 of FIG. 5A. The method 700 may be performed by the processor 405.

The method 700 starts, and in one embodiment, the processor 405 detects 705 a first edit 270 to the textual ladder logic programming interface 160. If the processor 405 does not detect 705 the first edit 270, the processor 405 continues to monitor for the edit 270.

If the processor 405 detects 705 the first edit 270, the processor 405 may set 710 the textual representation edit indicator 245. In addition, the processor 405 may set 715 the graphical entry pause indicator 215. Setting 715 the graphical entry pause indicator 215 may pause all entries of subsequent second edits 270 to the graphical ladder logic programming interface 155. In one embodiment, only the rung edit indicator 235 of the textual representation edit indicator 245 for the rung 250 that receives the edit 270 is set 710.

The processor 405 may refresh 720 the graphical ladder logic programming interface 155. In one embodiment, the graphical ladder logic programming interface 155 is refreshed 720 with a synchronized edit 275 corresponding to the first edit 270.

In a certain embodiment, the processor 405 refreshes 720 the graphical ladder logic programming interface 155 by propagating the edit 270 to the textual ladder logic code 145. The processor 405 may further synchronize the textual ladder logic code 145 to the executable code base 130 using the code synchronizer 135b. The processor 405 may employ the programming interface coordinator 170 and the code synchronizer 135a to synchronize the executable code base 130 with the graphical ladder logic code 140. In addition, the processor 405 may propagate the graphical ladder logic code 140 to the graphical ladder logic programming interface 155. In one embodiment, the processor 405 only refreshes 720 the rung 250 of the graphical ladder logic code 140 and/or the graphical ladder logic programming interface 155 corresponding to the rung change indicator 235.

The processor 405 may set 725 the graphical refresh complete indicator 280. The processor 405 may further clear 730 the graphical entry pause indicator 215. The processor 405 may clear 730 the graphical entry pause indicator 215 in response to setting 725 the graphical refresh complete indicator 280. As a result, subsequent second edits 270 may be accepted by the graphical ladder logic programming interface 155.

The processor 405 may clear 735 the textual representation edit indicator 245. The textual representation edit indicator 245 may be cleared 735 in response to setting 725 the graphical refresh complete indicator 280. In one embodiment, only the rung change indicator 235 corresponding to the edit 270 is cleared 735.

The processor 405 may clear 740 the graphical refresh complete indicator 280 and the method 700 ends. The method 700 may assure that no subsequent second edits 270 are made to the graphical ladder logic programming interface 155 until the first edit 270 made to the textual ladder logic programming interface 160 is propagated as a synchronized edit 275 to the graphical ladder logic programming interface 155.

Figure 5D:
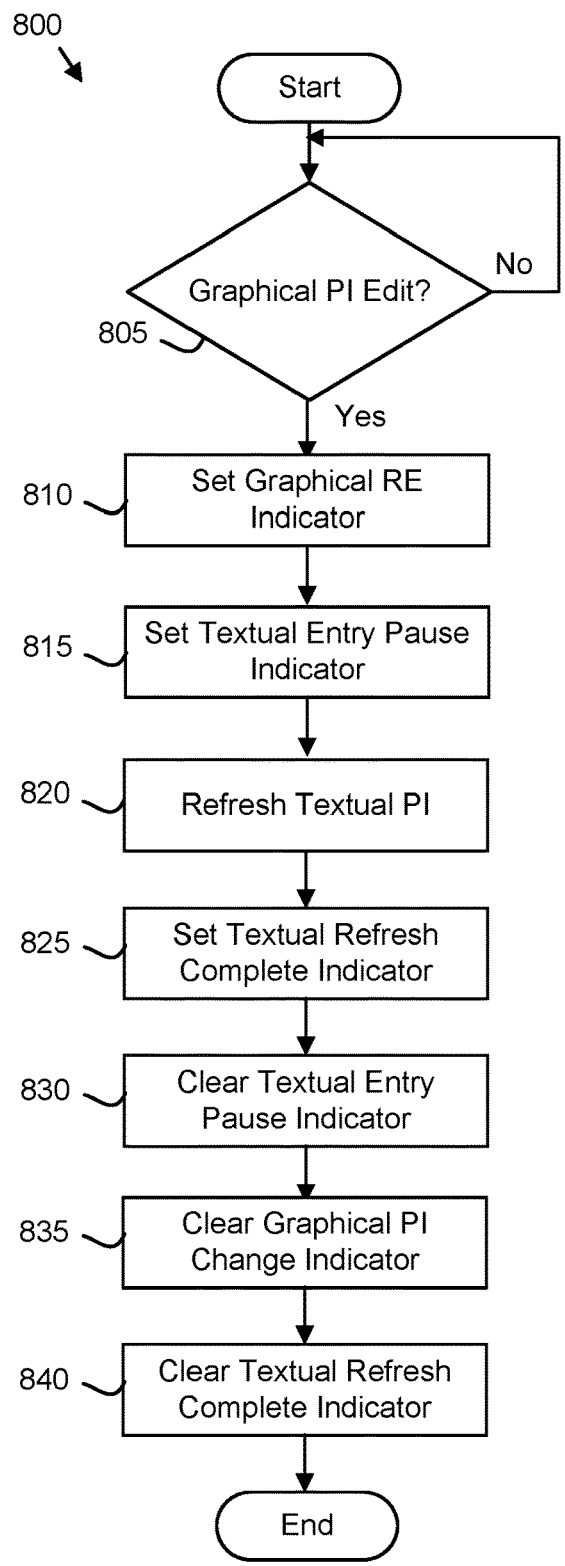
FIG. 5D is a schematic flowchart diagram of a coordination method according to an alternative embodiment.

FIG. 5D is a schematic flowchart diagram of a coordination method 800. The method 800 may coordinate dynamic synchronization of an edit 270 to the graphical ladder logic programming interface 155 to the textual ladder logic programming interface 160. The method 800 may perform step 530 of FIG. 5A. The method 800 may be performed by the processor 405.

The method 800 starts, and in one embodiment, the processor 405 detects 805 a first edit 270 to the graphical ladder logic programming interface 155. If the processor 405 does not detect 805 the edit 270, the processor 405 continues to monitor for the first edit 270.

If the processor 405 detects 805 the first edit 270, the processor 405 may set 810 the graphical representation edit indicator 240. In addition, the processor 405 may set 815 the textual entry pause indicator 220. Setting 815 the textual entry pause indicator 220 may pause all entries of subsequent second edits 270 to the textual ladder logic programming interface 160. In one embodiment, only the rung edit indicator 230 for the rung 250 that receives the first edit 270 is set 810.

The processor 405 may refresh 820 the textual ladder logic programming interface 160. In one embodiment, the textual ladder logic programming interface 160 is refreshed 820 with a synchronized edit 275 that corresponds to the edit 270.

The processor 405 may refresh 820 the textual ladder logic programming interface 160 by propagating the edit 270 to the graphical ladder logic code 140. In addition, the processor may synchronize the graphical ladder logic code 140 to the executable code base 130 using the code synchronizer 135a. The processor may further employ the programming interface coordinator 170 and the code synchronizer 135b to synchronize the executable code base 130 with the textual ladder logic code 145. The processor 405 may further propagate the textual ladder logic code 145 to the textual ladder logic programming interface 160. In one embodiment, the processor 405 only refreshes 820 the rung 250 of the graphical ladder logic programming interface 155 corresponding to the rung change indicator 230.

The processor 405 may set 825 the textual refresh complete indicator 285. In addition, the processor 405 may clear 830 the textual entry pause indicator 220. The processor 405 may clear 830 the textual entry pause indicator 220 in response to setting 825 the textual refresh complete indicator 285. As a result, subsequent second edits 270 may be accepted by the textual ladder logic programming interface 160.

The processor 405 may clear 840 the textual refresh complete indicator 285 and the method 800 ends. The method 800 may assure that no subsequent edits 270 are made to the textual ladder logic programming interface 160 until a first edit 270 made to the graphical ladder logic programming interface 155 is propagated as a synchronized edit 275 to the textual ladder logic programming interface 160.

Problem/Solution

Both graphical ladder logic programming interfaces 155 and textual ladder logic programming interfaces 160 are employed by users to generate the executable code base 130 for the programmable logic controller 120. Each of the programming interfaces 155/160 has unique advantages and disadvantages. For example, the graphical ladder logic program interface 155 allows for easy visualization of components while the textual ladder logic programming interface 160 allowed for rapid edits to components and component parameters.

Unfortunately, users have been unable to use both graphical ladder logic programming interfaces 155 and textual ladder logic programming interfaces 160 because of difficulties synchronizing edits 270 between the programming interfaces 155/160. The embodiments dynamically synchronize the graphical ladder logic programming interface 155 to the executable code base 130 of ladder logic instructions and concurrently dynamically synchronize the textual ladder logic programming interface 160 to the executable code base 130. As a result, a user may create and edit the executable code base 130 using both the graphical ladder logic programming interface 155 and the textual ladder logic programming interface 160 concurrently. The embodiments prevent the user from making a second subsequent edit 270 to a second programming interface 155/160 until all first edits 270 to a first programming interface 155/160 have been propagated to the second programming interface 155/160.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   dynamically synchronizing, by use of a processor, a graphical ladder logic programming interface to an executable code base of ladder logic instructions;
   concurrently dynamically synchronizing a textual ladder logic programming interface to the executable code base;
   coordinating the dynamic synchronization of the graphical ladder logic programming interface and the dynamic synchronization of the textual ladder logic programming interface by:
   detecting a first edit to one of the graphical ladder logic programming interface and the textual ladder logic programming interface,
   pausing entry of a second edit to the other of the graphical ladder logic programming interface and the textual ladder logic programming interface; and
   refreshing the first edit to the other of the graphical ladder logic programming interface and the textual ladder logic programming interface.

2. The method of claim 1, wherein the dynamic synchronization of the graphical ladder logic programming interface and the dynamic synchronization of the textual ladder logic programming interface are further coordinated by:
   detecting a first edit to the textual ladder logic programming interface;
   setting a graphical entry pause indicator, wherein no subsequent second edits are accepted to the graphical ladder logic programming interface;
   refreshing the graphical ladder logic programming interface;
   setting a graphical refresh complete indicator; and
   clearing the graphical entry pause indicator, wherein subsequent second edits are accepted to the graphical ladder logic programming interface.

3. The method of claim 2, the method further comprising setting a textual representation edit indicator in response to detecting the first edit to the textual ladder logic programming interface.

4. The method of claim 3, wherein the textual representation edit indicator comprises a rung edit indicator for each rung of the ladder logic instructions in the executable code base.

5. The method of claim 1, wherein the dynamic synchronization of the graphical ladder logic programming interface and the dynamic synchronization of the textual ladder logic programming interface are further coordinated by:
   detecting a first edit to the graphical ladder logic programming interface;
   setting a textual entry pause indicator, wherein no subsequent second edits are accepted to the textual ladder logic programming interface;
   refreshing the textual ladder logic programming interface;
   setting a textual refresh complete indicator; and
   clearing the textual entry pause indicator, wherein subsequent second edits are accepted to the textual ladder logic programming interface.

6. The method of claim 5, the method further comprising setting a graphical representation change indicator in response to detecting the first edit to the graphical ladder logic programming interface.

7. The method of claim 6, wherein the graphical representation edit indicator comprises a rung edit indicator for each rung of the ladder logic instructions in the executable code base.

8. The method of claim 1, wherein the method further comprises:
   presenting the graphical ladder logic programming interface; and
   concurrently presenting the textual ladder logic programming interface.

9. An apparatus comprising:
   a processor;
   a memory storing code executable by the processor to perform:
   dynamically synchronizing a graphical ladder logic programming interface to an executable code base of ladder logic instructions;
   concurrently dynamically synchronizing a textual ladder logic programming interface to the executable code base;
   coordinating the dynamic synchronization of the graphical ladder logic programming interface and the dynamic synchronization of the textual ladder logic programming interface by:
   detecting a first edit to one of the graphical ladder logic programming interface and the textual ladder logic programming interface,
   pausing entry of a second edit to the other of the graphical ladder logic programming interface and the textual ladder logic programming interface; and
   refreshing the first edit to the other of the graphical ladder logic programming interface and the textual ladder logic programming interface.

10. The apparatus of claim 9, wherein the dynamic synchronization of the graphical ladder logic programming interface and the dynamic synchronization of the textual ladder logic programming interface are further coordinated by:
    detecting a first edit to the textual ladder logic programming interface;
    setting a graphical entry pause indicator, wherein no subsequent second edits are accepted to the graphical ladder logic programming interface;
    refreshing the graphical ladder logic programming interface;
    setting a graphical refresh complete indicator; and
    clearing the graphical entry pause indicator, wherein subsequent second edits are accepted to the graphical ladder logic programming interface.

11. The apparatus of claim 9, wherein the dynamic synchronization of the graphical ladder logic programming interface and the dynamic synchronization of the textual ladder logic programming interface are further coordinated by:
    detecting a first edit to the graphical ladder logic programming interface;
    setting a textual entry pause indicator, wherein no subsequent second edits are accepted to the textual ladder logic programming interface;
    refreshing the textual ladder logic programming interface;

setting a textual refresh complete indicator; and clearing the textual entry pause indicator, wherein subsequent second edits are accepted to the textual ladder logic programming interface.

12. A computer program product for dynamic synchronization, the computer program product comprising a computer readable storage medium having program code embodied therein, the program code readable/executable by a processor to perform:

dynamically synchronizing a graphical ladder logic programming interface to an executable code base of ladder logic instructions; and concurrently dynamically synchronizing a textual ladder logic programming interface to the executable code base;

coordinating the dynamic synchronization of the graphical ladder logic programming interface and the dynamic synchronization of the textual ladder logic programming interface by:

detecting a first edit to one of the graphical ladder logic programming interface and the textual ladder logic programming interface;

pausing entry of a second edit to the other of the graphical ladder logic programming interface and the textual ladder logic programming interface; and refreshing the first edit to the other of the graphical ladder logic programming interface and the textual ladder logic programming interface.

13. The computer program product of claim 12, wherein the dynamic synchronization of the graphical ladder logic programming interface and the dynamic synchronization of the textual ladder logic programming interface are further coordinated by:

detecting a first edit to the textual ladder logic programming interface;

setting a graphical entry pause indicator, wherein no subsequent second edits are accepted to the graphical ladder logic programming interface;

refreshing the graphical ladder logic programming interface;

setting a graphical refresh complete indicator; and clearing the graphical entry pause indicator, wherein subsequent second edits are accepted to the graphical ladder logic programming interface.

14. The computer program product of claim 1, wherein the dynamic synchronization of the graphical ladder logic programming interface and the dynamic synchronization of the textual ladder logic programming interface are further coordinated by:

detecting a first edit to the graphical ladder logic programming interface;

setting a textual entry pause indicator, wherein no subsequent second edits are accepted to the textual ladder logic programming interface;

refreshing the textual ladder logic programming interface;

setting a textual refresh complete indicator; and clearing the textual entry pause indicator, wherein subsequent second edits are accepted to the textual ladder logic programming interface.

15. The apparatus of claim 10, the processor further setting a textual representation edit indicator in response to detecting the first edit to the textual ladder logic programming interface, wherein the textual representation edit indicator comprises a rung edit indicator for each rung of the ladder logic instructions in the executable code base.

16. The apparatus of claim 11, the processor further setting a graphical representation change indicator in response to detecting the first edit to the graphical ladder logic programming interface, wherein the graphical representation edit indicator comprises a rung edit indicator for each rung of the ladder logic instructions in the executable code base.

17. The apparatus of claim 9, the processor further performing:

presenting the graphical ladder logic programming interface; and concurrently presenting the textual ladder logic programming interface.

18. The computer program product of claim 13, the processor further setting a textual representation edit indicator in response to detecting the first edit to the textual ladder logic programming interface, wherein the textual representation edit indicator comprises a rung edit indicator for each rung of the ladder logic instructions in the executable code base.

19. The computer program product of claim 14, the processor further setting a graphical representation change indicator in response to detecting the first edit to the graphical ladder logic programming interface, wherein the graphical representation edit indicator comprises a rung edit indicator for each rung of the ladder logic instructions in the executable code base.

20. The computer program product of claim 12, the processor further performing:

presenting the graphical ladder logic programming interface; and concurrently presenting the textual ladder logic programming interface.

* * * * *